(12) United States Patent
Duffy (10) Patent No.: US 10,576,314 B2
(45) Date of Patent: Mar. 3, 2020

(54) RESPIRATOR INCLUDING CONTRAST LAYER

(71) Applicant: 3M INNOVATIVE PROPERTIES COMPANY, St. Paul, MN (US)

(72) Inventor: Dean R. Duffy, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 322 days.

(21) Appl. No.: 15/834,121

(22) Filed: Dec. 7, 2017

(65) Prior Publication Data

US 2018/0099165 A1 Apr. 12, 2018

Related U.S. Application Data

(62) Division of application No. 14/333,542, filed on Jul. 17, 2014, now Pat. No. 9,868,002.

(51) Int. Cl.
| | |
|---|---|
| *A62B 23/00* | (2006.01) |
| *A41D 13/11* | (2006.01) |
| *A62B 23/02* | (2006.01) |
| *B01D 46/00* | (2006.01) |

(52) U.S. Cl.
CPC ........ *A62B 23/025* (2013.01); *A41D 13/1115* (2013.01); *A41D 13/1161* (2013.01); *B01D 46/0001* (2013.01)

(58) Field of Classification Search
CPC ............... A41D 13/11; A41D 13/1123; A41D 13/1146; A41D 13/1115; A41D 13/1161; A62B 23/025; A62B 23/02; A62B 23/00; A62B 23/06; A62B 17/04; A62B 18/00;
(Continued)

(56) References Cited

U.S. PATENT DOCUMENTS

| | | |
|---|---|---|
| 3,888,246 A | 6/1975 | Lauer |
| 3,890,966 A | 6/1975 | Aspelin |
| D248,497 S | 7/1978 | Slosek |

(Continued)

FOREIGN PATENT DOCUMENTS

| | | |
|---|---|---|
| CA | 13216 | 1/1942 |
| CA | 2180391 | 1/1997 |

(Continued)

OTHER PUBLICATIONS

"Critical Cover CoolOne Masks", Alpha ProTech, [online] [retrieved from internet on Sep. 29, 2014] ULR < http://www.alphaprotech.com/product/158.aspx?catid=29>, 1 page.

(Continued)

*Primary Examiner* — Tarla R Patel (57) ABSTRACT

Various embodiments of a respirator and a method of making such respirator are disclosed. In one or more embodiments, the respirator includes a mask body and a harness attached to the mask body. The mask body can include an outer cover web, an inner cover web, a filtration layer disposed between the outer cover web and the inner cover web, and a contrast layer disposed between the outer cover web and the inner cover web in a sinus region of the mask body. A portion of the contrast layer can be visible through an outer surface of the outer cover web to form a contrast region of the mask body, where the outer surface of the outer cover web faces away from the filtration layer.

19 Claims, 7 Drawing Sheets

(58) Field of Classification Search
CPC ....... A62B 18/02; A62B 18/025; A62B 18/06; A61F 9/04; A61F 9/06; B01D 46/0001
See application file for complete search history.

(56) References Cited

U.S. PATENT DOCUMENTS

| | | | |
|---|---|---|---|
| D259,817 S | 7/1981 | White | |
| 4,300,549 A * | 11/1981 | Parker | A41D 13/1115 128/206.12 |
| 4,319,567 A | 3/1982 | Magidson | |
| 4,419,993 A | 12/1983 | Petersen | |
| 4,536,440 A | 8/1985 | Berg | |
| D287,649 S | 1/1987 | Zdrok | |
| 4,635,628 A | 1/1987 | Hubbard | |
| 4,688,566 A | 8/1987 | Boyce | |
| 4,790,306 A | 12/1988 | Braun | |
| 4,807,619 A | 2/1989 | Dyrud | |
| 4,984,302 A | 1/1991 | Lincoln | |
| 5,181,506 A * | 1/1993 | Tardiff, Jr. | A61F 9/02 128/201.22 |
| 5,463,273 A | 10/1995 | Kato | |
| 5,553,608 A | 9/1996 | Reese | |
| 5,673,690 A * | 10/1997 | Tayebi | A41D 13/1115 128/205.27 |
| 5,699,792 A * | 12/1997 | Reese | A41D 13/1115 128/206.19 |
| 5,706,803 A | 1/1998 | Bayer | |
| D390,652 S | 2/1998 | Parker | |
| 5,724,964 A | 3/1998 | Brunson | |
| 5,765,556 A | 6/1998 | Brunson | |
| 5,803,075 A | 9/1998 | Yavitz | |
| 5,813,398 A | 9/1998 | Baird | |
| D420,769 S | 2/2000 | White | |
| 6,041,782 A | 3/2000 | Angadjivand | |
| 6,055,982 A | 5/2000 | Brunson | |
| 6,123,077 A | 9/2000 | Bostock | |
| 6,173,712 B1 | 1/2001 | Brunson | |
| 6,394,090 B1 | 5/2002 | Chen | |
| 6,484,722 B2 | 11/2002 | Bostock | |
| 6,520,181 B2 | 2/2003 | Baumann | |
| 6,568,392 B1 | 5/2003 | Bostock | |
| 6,923,182 B2 | 8/2005 | Angadjivand | |
| 7,131,442 B1 | 11/2006 | Kronzer | |
| RE39,493 E | 2/2007 | Yuschak | |
| 7,290,545 B2 | 11/2007 | Kleman | |
| D659,821 S | 5/2012 | Spoo | |
| D678,507 S | 3/2013 | Duffy | |
| 8,430,100 B2 | 4/2013 | Reese | |
| D695,886 S | 12/2013 | Dawson | |
| 8,881,729 B2 | 11/2014 | Duffy | |
| 9,770,057 B2 | 9/2017 | Duffy | |
| 9,868,002 B2 | 1/2018 | Duffy | |
| 2003/0028946 A1 | 2/2003 | Zegarelli | |
| 2008/0105261 A1 | 5/2008 | Harold | |
| 2008/0105262 A1 | 5/2008 | Harold | |
| 2008/0271737 A1 | 11/2008 | Facer | |
| 2010/0154805 A1 | 6/2010 | Duffy | |
| 2010/0154806 A1 | 6/2010 | Duffy | |
| 2011/0067700 A1 | 3/2011 | Spoo | |
| 2011/0067701 A1 | 3/2011 | Duffy | |
| 2011/0315144 A1 | 12/2011 | Eitzman | |
| 2013/0291877 A1 | 11/2013 | Nguyen | |
| 2014/0182593 A1 | 7/2014 | Duffy | |
| 2014/0182600 A1 | 7/2014 | Duffy | |

FOREIGN PATENT DOCUMENTS

| | | |
|---|---|---|
| CA | 83963 | 5/1998 |
| CN | 3148731 | 5/2000 |
| CN | 2621738 | 6/2004 |
| CN | 3585180 | 11/2006 |
| CN | 3650369 | 5/2007 |
| CN | 3676888 | 8/2007 |
| CN | 300709382 | 11/2007 |
| CN | 300730966 | 1/2008 |
| CN | 300885357 | 2/2009 |
| CN | 300894832 | 3/2009 |
| CN | 301035315 | 10/2009 |
| CN | 201349551 | 11/2009 |
| CN | 301058343 | 11/2009 |
| CN | 301114348 | 1/2010 |
| CN | 301168433 | 3/2010 |
| CN | 301177581 | 4/2010 |
| CN | 302193140 | 11/2012 |
| CN | 302314780 | 2/2013 |
| CN | 302447013 | 5/2013 |
| CN | 302711320 | 1/2014 |
| EP | 695774 | 2/1996 |
| EP | 1743535 | 1/2007 |
| EP | 1795079 | 6/2007 |
| FR | 2471792 | 6/1981 |
| FR | 2871063 | 12/2005 |
| GB | 1239039 | 7/1971 |
| GB | 2025773 | 1/1980 |
| GB | 2027802 | 2/1980 |
| JP | 2008-055036 | 3/2008 |
| JP | D1413400 | 4/2011 |
| JP | 2011-239871 | 12/2011 |
| JP | D1446847 | 6/2012 |
| KR | 2011-0007058 | 7/2011 |
| RU | 2101050 | 1/1998 |
| RU | 44538 | 7/1998 |
| RU | 66556 | 5/2008 |
| RU | 71056 | 6/2009 |
| RU | 73548 | 12/2009 |
| RU | 82486 | 7/2012 |
| RU | 85919 | 7/2013 |
| TW | 201021874 | 6/2010 |
| WO | 1997/32494 | 9/1997 |
| WO | 1999/30583 | 6/1999 |
| WO | 2001/82727 | 11/2001 |
| WO | 2003/068319 | 8/2003 |

OTHER PUBLICATIONS

"Critical Cover Protective Apparel & Accessories", Alpha ProTech, May 2012, ULR < www.alphaprotech.com/productDocs/HCB.pdf>, 20 pages.

"Crosstex, A Cantel Medical Company, 2014 Infection Prevention Catalog", Oct. 28, 2013, ULR <www.crosstex.com/pdfs/Crosstex-2014Catalog-Web pdf>, 46 pages.

"Crosstex-making the practice of healthcare safer", [online], [retrieved from internet on Sep. 29, 2014], ULR <http://www.crosstex.com/home.asp>, 1 page.

"Precept Medical Products", [online], [retrieved from internet on Sep. 29, 2014], ULR <https://www.preceptmed.com>, 2 pages.

"Surgical Face Masks", Berkely Surgical Company, [online], [retrieved from internet on Sep. 29, 2014], ULR < http://www.berkleysurgical.com/Surgical-Face-Mask-Products/disposable-surgical-face-masks.php>, 3 pages.

"New FluidGard Plus", Precept Medical Products, Inc. Jul. 2012, URL <preceptmed.com/Douments/FluidGard®PlusFactSheet.pdf>, 2 pages.

* cited by examiner

RESPIRATOR INCLUDING CONTRAST LAYER

BACKGROUND

Respirators are commonly worn over a person's breathing passages for at least one of two common purposes: (1) to prevent impurities or contaminants from entering the wearer's respiratory system; and (2) to protect other persons or things from being exposed to pathogens and other contaminants exhaled by the wearer. In the first situation, the respirator is worn in an environment where the air contains particles that may be harmful to the wearer, for example, in an auto body shop. In the second situation, the respirator is worn in an environment where there is risk of contamination to other persons or things, for example, in an operating room or clean room.

A variety of respirators have been designed to meet either (or both) of these purposes. Some respirators have been categorized as being "filtering face-pieces" because the mask body itself functions as the filtering mechanism. Unlike respirators that use rubber or elastomeric mask bodies with attachable filter cartridges (see, e.g., U.S. Pat. RE39,493 to Yuschak et al.) or insert-molded filter elements (see, e.g., U.S. Pat. No. 4,790,306 to Braun), filtering face-piece respirators are designed to have the filter media cover much of the mask body so that there is no need for installing or replacing a filter cartridge. These filtering face-piece respirators commonly come in one of two configurations: molded respirators and flat-fold respirators.

Molded filtering face-piece respirators often include nonwoven webs of thermally-bonding fibers or open-work plastic meshes to furnish the mask body with its cup-shaped configuration. Molded respirators tend to maintain the same shape during both use and storage. These respirators, therefore, cannot be folded flat for storage and shipping. Examples of patents that disclose molded, filtering, face-piece respirators include U.S. Pat. No. 7,131,442 to Kronzer et al; U.S. Pat. Nos. 6,923,182, and 6,041,782 to Angadjivand et al.; U.S. Pat. No. 4,807,619 to Dyrud et al.; and U.S. Pat. No. 4,536,440 to Berg.

Flat-fold respirators—as their name implies—can be folded flat for shipping and storage. Such respirators can be opened into a cup-shaped configuration for use. Examples of flat-fold respirators are described in U.S. Pat. Nos. 6,568,392 and 6,484,722 to Bostock et al.; and U.S. Pat. No. 6,394,090 to Chen. Some flat-fold respirators have been designed with weld lines, seams, and folds to help maintain their cup-shaped configuration during use. Stiffening members also have been incorporated into panels of the mask body. See, e.g., U.S. Pat. No. 8,640,704 and U.S. Publication No. 2010/0154805 to Duffy et al.; and U.S. Design Patent 659,821 to Spoo et al.

SUMMARY

In general, the present disclosure provides one or more embodiments of a respirator that includes a contrast layer.

In one aspect, the present disclosure provides a respirator that includes a mask body and a harness attached to the mask body. The mask body includes an outer cover web, an inner cover web, a filtration layer disposed between the outer cover web and the inner cover web, and a contrast layer disposed between the outer cover web and the inner cover web in a sinus region of the mask body. A portion of the contrast layer is visible through an outer surface of the outer cover web to form a contrast region of the mask body, where the outer surface of the outer cover web faces away from the filtration layer.

In another aspect, the present disclosure provides a respirator that includes a mask body and a harness attached to the mask body. The mask body includes an outer cover web, an inner cover web, a filtration layer disposed between the outer cover web and the inner cover web, and a contrast layer disposed on an outer surface of the outer cover web, where the outer surface of the outer cover web faces away from the filtration layer. The contrast layer includes an outer surface that has a surface area that is at least 10% of a surface area of an exterior surface of the mask body. And the surface area of the outer surface of the contrast layer is less than 50% of the surface area of the exterior surface of the mask body.

In another aspect, the present disclosure provides a method of making a respirator. The method includes forming a mask body of the respirator, the mask body including an outer cover web, an inner cover web, a filtration layer disposed between the outer cover web and the inner cover web, and a contrast layer disposed between the outer cover web and the inner cover web in a sinus region of the mask body. The method further includes folding a portion of the inner cover web over an upper perimeter segment of the mask body and over a portion of an outer surface of the outer cover web such that the portion of the inner cover web becomes the outermost layer in the sinus region of the mask body.

The terms "comprises" and variations thereof do not have a limiting meaning where these terms appear in the description and claims. Such terms will be understood to imply the inclusion of a stated step or element or group of steps or elements but not the exclusion of any other step or element or group of steps or elements. By "consisting of" is meant including, and limited to, whatever follows the phrase "consisting of." Thus, the phrase "consisting of" indicates that the listed elements are required or mandatory, and that no other elements may be present. By "consisting essentially of" is meant including any elements listed after the phrase, and limited to other elements that do not interfere with or contribute to the activity or action specified in the disclosure for the listed elements. Thus, the phrase "consisting essentially of" indicates that the listed elements are required or mandatory, but that other elements are optional and may or may not be present depending upon whether or not they materially affect the activity or action of the listed elements.

The words "preferred" and "preferably" refer to embodiments of the disclosure that may afford certain benefits, under certain circumstances; however, other embodiments may also be preferred, under the same or other circumstances. Furthermore, the recitation of one or more preferred embodiments does not imply that other embodiments are not useful, and is not intended to exclude other embodiments from the scope of the disclosure.

In this application, terms such as "a," "an," and "the" are not intended to refer to only a singular entity, but include the general class of which a specific example may be used for illustration. The terms "a," "an," and "the" are used interchangeably with the term "at least one." The phrases "at least one of" and "comprises at least one of" followed by a list refers to any one of the items in the list and any combination of two or more items in the list.

The phrases "at least one of" and "comprises at least one of" followed by a list refers to any one of the items in the list and any combination of two or more items in the list.

As used herein, the term "or" is generally employed in its usual sense including "and/or" unless the content clearly dictates otherwise.

The term "and/or" means one or all of the listed elements or a combination of any two or more of the listed elements.

Also herein, all numbers are assumed to be modified by the term "about" and preferably by the term "exactly." As used herein in connection with a measured quantity, the term "about" refers to that variation in the measured quantity as would be expected by the skilled artisan making the measurement and exercising a level of care commensurate with the objective of the measurement and the precision of the measuring equipment used. Herein, "up to" a number (e.g., up to 50) includes the number (e.g., 50).

Also herein, the recitations of numerical ranges by endpoints include all numbers subsumed within that range as well as the endpoints (e.g., 1 to 5 includes 1, 1.5, 2, 2.75, 3, 3.80, 4, 5, etc.).

The terms set forth herein will have the meanings as defined:

"clean air" means a volume of atmospheric ambient air that has been filtered to remove contaminants;

"contaminants" means particles (including dusts, mists, and fumes) and/or other substances that generally may not be considered to be particles (e.g., organic vapors, etc.) but which may be suspended in air;

"contrast layer" means a layer or layers that provide a contrast in visual appearance with layers or materials adjacent to the contrast layer;

"contrast region" means an area or portion of a mask body of a respirator where a contrast in visual appearance between a contrast layer and layers or materials adjacent the contrast layer is formed;

"crosswise dimension" is the dimension that extends laterally across the respirator, from side-to-side when the respirator is viewed from the front;

"cup-shaped configuration" and variations thereof mean any vessel-type shape that is capable of adequately covering the nose and mouth of a person;

"cushioning member" and variations thereof mean a compressible material that does not include the filter media or the filtering structure;

"distinctive identification" means a contrasting feature formed on or in a mask body that can be seen from a great distance away such as across a worksite, e.g., a contrast region can include or convey distinctive identification;

"exterior gas space" means the ambient atmospheric gas space into which exhaled gas enters after passing through and beyond the mask body and/or exhalation valve;

"exterior surface" means the surface of the mask body exposed to ambient atmospheric gas space when the mask body is positioned on the person's face;

"filtering face-piece" means that the mask body itself is designed to filter air that passes through it; there are no separately identifiable filter cartridges or insert-molded filter elements attached to or molded into the mask body to achieve this purpose;

"filter" or "filtration layer" means one or more layers of air-permeable material, which layer(s) is adapted for the primary purpose of removing contaminants (such as particles) from an air stream that passes through it;

"filter media" means an air-permeable structure that is designed to remove contaminants from air that passes through it;

"filtering structure" means a generally air-permeable construction that filters air;

"folded inwardly" means being bent back towards the part from which IT extends;

"harness" means a structure or combination of parts that assists in supporting the mask body on a wearer's face;

"interior gas space" means the space between a mask body and a person's face;

"interior surface" means the surface of the mask body closest to a person's face when the mask body is positioned on the person's face;

"line of demarcation" means a fold, seam, weld line, bond line, stitch line, hinge line, and/or any combination thereof;

"mask body" means an air-permeable structure that is designed to fit over the nose and mouth of a person and that helps define an interior gas space separated from an exterior gas space (including the seams and bonds that join layers and parts thereof together);

"nose clip" means a mechanical device (other than a nose foam), which device is adapted for use on a mask body to improve the seal at least around a wearer's nose;

"perimeter" means the outer edge of the mask body, which outer edge would be disposed generally proximate to a wearer's face when the respirator is being donned by a person; a "perimeter segment" is a portion of the perimeter;

"pleat" means a portion that is designed to be or is folded back upon itself;

"polymeric" and "plastic" each means a material that mainly includes one or more polymers and that may contain other ingredients as well;

"respirator" means an air filtration device that is worn by a person to provide the wearer with clean air to breathe;

"sinus region" means the nose region and parts or areas of the mask body that reside beneath the wearer's eyes and/or eye orbitals when the respirator is being worn in a proper configuration;

"snug fit" or "fit snugly" means that an essentially airtight (or substantially leak-free) fit is provided (between the mask body and the wearer's face); and "transversely extending" means extending generally in the crosswise dimension.

These and other aspects of the present disclosure will be apparent from the detailed description below. In no event, however, should the above summaries be construed as limitations on the claimed subject matter, which subject matter is defined solely by the attached claims, as may be amended during prosecution.

BRIEF DESCRIPTION OF THE DRAWINGS

Throughout the specification, reference is made to the appended drawings, where like reference numerals designate like elements, and wherein.

DETAILED DESCRIPTION

In general, the present disclosure provides one or more embodiments of a respirator that includes a contrast layer. The contrast layer can create a unique appearance for the respirator. For example, in one or more embodiments, the contrast layer can include a color, pattern, and/or texture, or combinations thereof that provides a contrast in visual appearance or feel with layers or materials adjacent the contrast layer.

Respirators, e.g., flat fold respirators, may be challenging for a user to position on the user's face as it may be difficult to determine in what orientation the mask should be applied. One or more embodiments of the respirators described in the present disclosure may aid the user in quickly and easily identifying the proper orientation of the mask. For example, the contrast layer can exhibit a color that identifies the sinus region that is to be applied on a nose of a wearer. Further, in one or more embodiments, the contrast layer can help prevent a mask body of the respirator from collapsing by shaping the mask body in a more cup-like configuration. And in one or more embodiments, the contrast layer can also help reduce eyeglass fogging by creating a pressure drop through the mask body in a sinus region of the mask body that is greater than a pressure drop across a primary filtering region of the mask body where the contrast layer is not disposed. Furthermore, in one or more embodiments, the contrast layer can add distinctive identification to the mask body that can convey, even at great distances, information such as the type, style, brand, performance rating, and manufacturer of the respirator. This distinctive identification can help ensure that the appropriate type of respirator is being used for a given environment or task.

Figure 1:
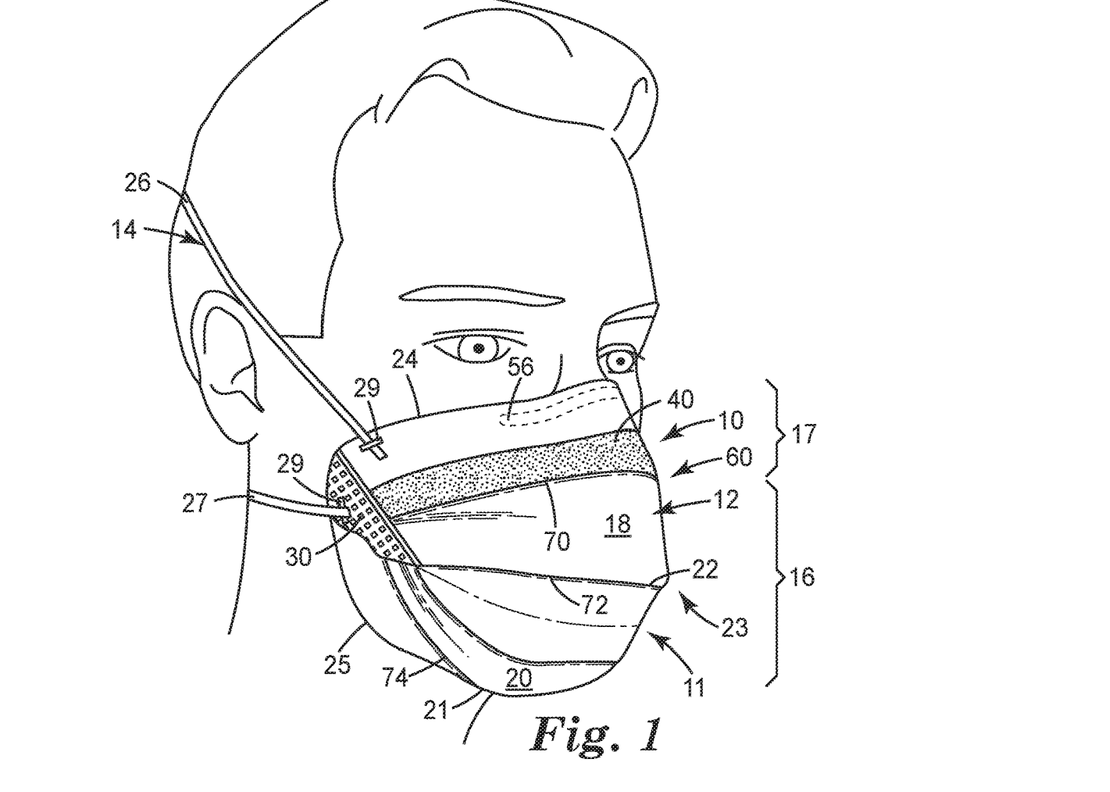
FIG. 1 is a schematic perspective view of one embodiment of a respirator positioned on a face of a wearer.
Figure 2:
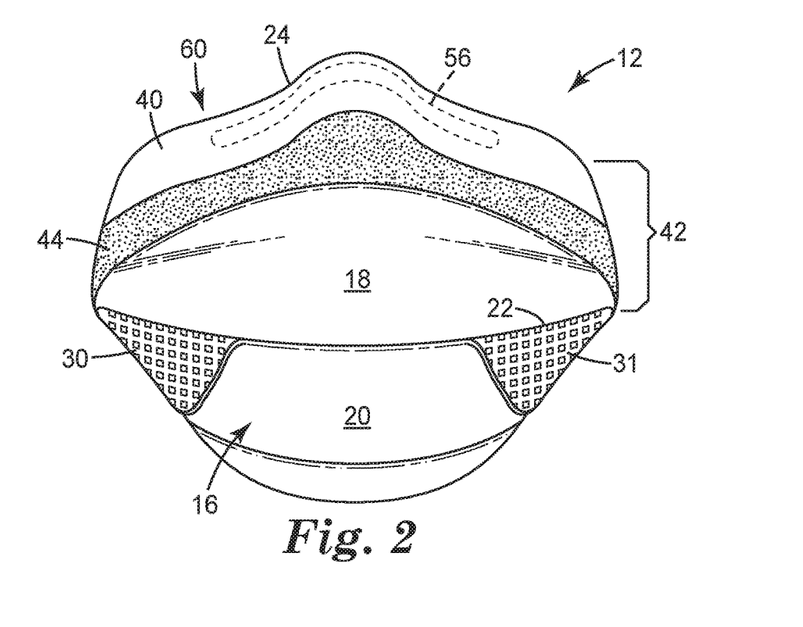
FIG. 2 is a schematic front view of the respirator of FIG. 1.
Figure 3:
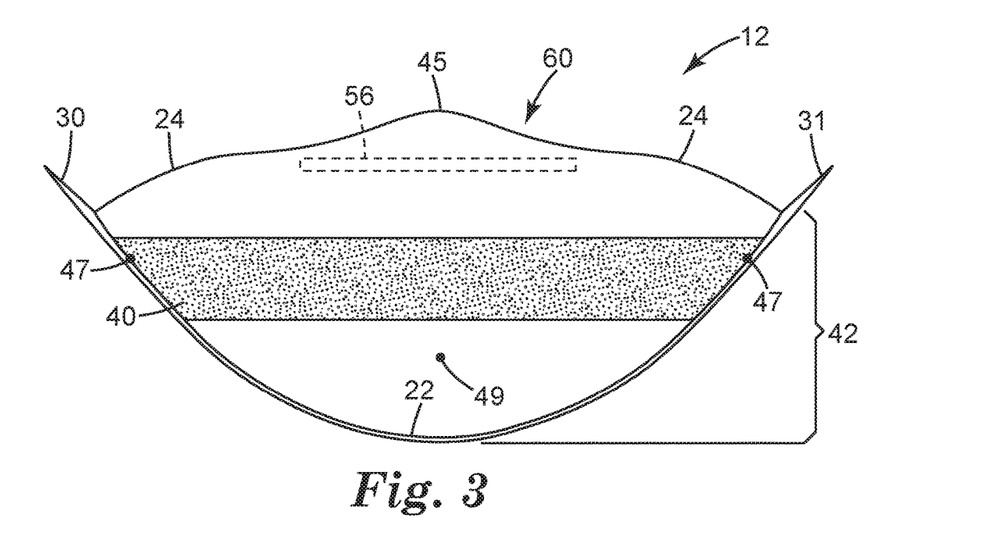
FIG. 3 is a schematic top view of the respirator of FIG. 1.

The various embodiments of contrast layers that are described herein can be utilized with any suitable respirator. For example, FIG. 1 is a schematic perspective view of a respirator 10 as applied to a face of a user, FIG. 2 is a schematic perspective view of the respirator 10 of FIG. 1, and FIG. 3 is a schematic top view of the respirator of FIG. 1. The respirator 10 can be any suitable respirator. For example, as shown in FIG. 1, the respirator can be a filtering face-piece respirator. The respirator 10 includes a mask body 12 and a harness 14 attached to the mask body.

The mask body 12 can include any suitable mask body through which inhaled air passes before entering the wearer's respiratory system. The mask body 12 can remove contaminants from the ambient environment so that the wearer can breathe filtered air. Further, the mask body 12 may take a variety of different shapes and configurations and typically is adapted so that it fits against the wearer's face or within a support structure that contacts the face.

In the exemplary embodiment illustrated in FIG. 1, the mask body 12 includes a top portion 18 and a bottom portion 20 separated by a line of demarcation 22. In one or more embodiments, the top portion 18 can be 50% of a surface area of an exterior surface 11 of the mask body 12, and the bottom portion 20 can be 50% of the surface area of the exterior surface of the mask body.

In one or more embodiments, the line of demarcation 22 can be a fold or pleat that extends transversely across a central portion 23 of the mask body 12. The mask body 12 also includes a perimeter 21 that includes an upper segment 24 at top portion 18 and a lower segment 25 at bottom portion 20.

Attached to the mask body 12 is harness 14, which can include any suitable harness that can hold the mask body in place on a face of a wearer. As illustrated in FIG. 1, the harness 14 includes a first, upper strap 26 that is secured to the top portion 18 of mask body 12 adjacent the upper perimeter segment 24. As used herein, the phrase "adjacent the upper perimeter segment" means that an element is positioned closer to the upper perimeter segment 24 of the mask body 12 than the lower perimeter segment 25 of the mask body. Any suitable device or technique can be utilized to attach the upper strap 26 to the mask body 12, e.g., staple 29, stitching, adhesives, etc.

The harness 14 also includes a second, lower strap 27 that is attached to the mask body 12, in this embodiment, to a flange 30. The second, lower strap 27 can be attached to the mask body 12 using any suitable device or technique e.g., staple 29, stitching, adhesives, etc. Although not shown in FIG. 1, the straps 26, 27 are also attached to the opposite side of the mask body 12 in any suitable location, e.g. the same locations as shown in FIG. 1 on the opposite side of the mask body.

The straps 26, 27 may be made from a variety of materials, such as thermoset rubbers, thermoplastic elastomers, braided or knitted yarn and/or rubber combinations, inelastic braided components, and the like. In one or more embodiments, the straps 26, 27 can be expanded, e.g., to greater than twice their total length and be returned to their relaxed state. In one or more alternative embodiments, the straps 26, 27 also can be increased to three or four times their relaxed state length and can be returned to their original condition without any damage thereto when the tensile forces are removed from the straps. The straps 26, 27 may be continuous straps or may have a plurality of parts, which can be joined together by further fasteners or buckles. Alternatively, the straps may form a loop that is placed around the wearer's ears.

FIG. 2 shows that the mask body 12 can have first and second flanges 30 and 31 located on opposing sides of the mask body 12. An end of the lower strap 27 is attached to each flange 30, 31. The flanges 30 and 31 are folded inwardly towards the central region 23 of the mask body 12 and are in contact therewith. Additional details regarding flanges 30 and 31 and other features of respirator 10 and mask body 12 can be found, e.g., in U.S. Patent Application Publication No. 2014-0182593 to Duffy.

The respirator 10 can also include a nose clip 56 that can be disposed in any suitable location on or in the mask body 12. As illustrated in FIGS. 1-3, the nose clip 56 is disposed in a sinus region 60 of the mask body. The nose clip 56 can be disposed on or in the top portion 18 of the mask body 12 adjacent the upper perimeter segment 24, centrally positioned between the mask body side edges, to assist in achieving an appropriate fit on and around the nose and upper cheek bones of a wearer. The nose clip 56 may be made from a pliable metal or plastic that is capable of being manually adapted by the wearer to fit the contour of the wearer's nose. The nose clip 56 may include, for example, a malleable or pliable soft band of metal such as aluminum, which can be shaped to hold the mask in a desired fitting relationship over the nose of the wearer and where the nose meets the cheek.

FIG. 3 further illustrates sinus region 60 of the mask body 12. In defining the sinus region 60, an apex 45 of the top portion 18 of the mask body 12 is first located. In one or more embodiments, the outer extremities of the sinus region 60 can be located by moving along the upper perimeter segment 24 of the mask body 12, 9 cm on each side of the apex 45, until points 47 are located. Thus, if a string were laid on the upper perimeter segment 24 such that it followed the perimeter until reaching point 47, the string would be 9 cm in length on each side of point 45 for a total length of 18 cm. A third point 49 is located 6 cm away from the upper perimeter segment 24 along a line that bisects the mask body 12. The sinus region 60 is the surface area of the mask body that is located between the upper perimeter segment 24 and the lines that connect points 47 and point 49.

In one or more embodiments, the mask body 12 can include a cushioning member (not shown) that can be shaped and sized to enhance the comfort of the nose clip 56 when the mask is being worn. Any suitable cushioning member can be utilized with the mask body 12, e.g., the cushioning members described in U.S. Pat. No. 9,770,057 to Duffy.

In one or more embodiments, the mask body 12 can include a filtering region 16 and a barrier region 17. The barrier region 17 can be located in any suitable position relative to the mask body 12. In one or more embodiments, the barrier region 17 can be positioned in or on the sinus region 60 of the mask body 12. The barrier region 17 can prevent at least some air from passing through the mask body 12 in the barrier region 17. For example, in one or more embodiments, the barrier region 17, e.g., the sinus region 60, can increase a pressure drop across the region or portion of the mask body 12 that includes the barrier region. In the embodiment illustrated in FIGS. 1-3, the barrier region 17 can increase the pressure drop across the sinus region 60 of the mask body 12. The pressure drop in the sinus region 60 of the mask body 12 increases, and, in one or more embodiments, can be greater than the pressure drop across the filtering region 16. The pressure drop in the sinus region 60 may be typically increased from about 10 to about 100%. Because exhaled air follows a path of least resistance, it will have a greater tendency to pass through the mask body 12 at the filtering region 16 rather than through the sinus region 60. There is, accordingly, less opportunity for a wearer's eyewear to become fogged by the exhaled air that passes from an interior gas space to the exterior gas space when the barrier region 17 is disposed in the sinus region.

The mask body 12 can also include a contrast layer 40. The contrast layer 40 can be disposed in any suitable location on or in the mask body 12 as is further described herein. The contrast layer 40 can include any suitable material or combination of materials that can provide various functionalities to the respirator 10. For example, in one or more embodiments, the contrast layer 40 can include a color, texture, pattern, indicia, or combinations thereof that indicate to a wearer a preferred orientation of the mask body 12 relative to the wearer's face by providing a contrast between the contrast layer and layers or materials adjacent the contrast layer to form a contrast region 42.

For example, in the exemplary embodiment illustrated in FIGS. 1-3, the contrast layer 40 is disposed in the sinus region 60 of the mask body 12 to indicate to a wearer the location of the upper perimeter segment 24 so that the wearer places the mask in the proper orientation on the wearer's face, e.g., such that the nose clip 56 is placed over the nose of the wearer. Any suitable material or combination materials can be utilized for the contrast layer 40, e.g., colored or printed spunbonded polypropylene non-woven material, SMS spunbonded/melt blown/spunbonded non-woven material, and generally other materials that can be thermally, mechanically, or adhesively bonded to the mask body 12.

In one or more embodiments, the contrast layer 40 can include any suitable pattern or combination of patterns to provide or form contrast region 42, e.g., cross-hatched patterns, indicia, markings, etc. Such pattern or patterns can be formed using any suitable technique. For example, in one or more embodiments, a pattern or patterns can be printed onto contrast layer 40 using any suitable technique or combination of techniques. In one or more alternative embodiments, the pattern or patterns can be formed in the contrast layer 40 by, e.g., embedding, attaching, etc., materials on or into a substrate of the contrast layer 40. In one or more embodiments, the contrast layer 40 can include any suitable color or combination of colors, e.g., red, green, blue, yellow, magenta, etc.

Further, in one or more embodiments, the contrast layer 40 can include any suitable texture or combination of textures to provide a reform contrast region 42. Such texture textures can be formed using any suitable technique. For example, in one or more embodiments, a texture or textures can be embossed in the contrast layer 40.

In one or more embodiments, the contrast layer 40 can also include barrier properties such that an increase in pressure drop is provided in the sinus region 60 of the respirator to prevent or lessen moisture from forming on a wearer's eyeglasses or protective eyewear. Any suitable materials or combination of materials can be utilized for the contrast layer 40 to provide desired barrier properties to the respirator 10, e.g., spunbonded polypropylene (SBPP) non-woven material with a polyethylene coating, etc.

Further, in one or more embodiments, the contrast layer 40 can include any suitable material or materials such that the contrast layer 40 can aid in preventing the mask body from collapsing when being worn, e.g., 34-68 grams per square meter SBPP.

The contrast layer 40 can be positioned on or in the mask body 12 in any suitable location. Further, an outer surface 44 of the contrast layer 40 that faces away from an interior surface of the mask body 12 can have any suitable surface area as compared to a surface area of the exterior surface 11 of the mask body. For example, in one or more embodiments, the outer surface 44 of the contrast layer 40 can have a surface area that is at least 10% of the surface area of the exterior surface 11 of the mask body 12. In one or more embodiments, the outer surface 44 of the contrast layer 40 can have a surface area that is less than 50% of the surface area of the exterior surface 11 of the mask body 12.

As previously mentioned herein, the mask body 12 can include any suitable material or combination of materials. For example, in one or more embodiments, the mask body 12 can include a particle capture or gas- and vapor-type filter. The mask body 12 may also include a barrier layer that prevents the transfer of liquid from one side of the body to another to prevent, for instance, liquid aerosols or liquid splashes (e.g., blood) from penetrating the mask body. Multiple layers of similar or dissimilar filter media may be used to construct the mask body 12 as the application requires. Filtration layers that may be beneficially employed in a layered mask body are generally low in pressure drop (for example, less than about 195 to 295 Pascals at a face velocity of 13.8 centimeters per second) to minimize the breathing work of the mask wearer. Filtration layers additionally may be flexible and may have sufficient shear strength so that they generally retain their structure under the expected use conditions.

The mask body 12 can also include one or more pleats or folds 70, 72, 74 that allow the respirator 10 to be folded for storage or packaging. These pleats or folds 70, 72, 74 can be formed using any suitable technique or combination of techniques, e.g., commonly known techniques to manufacture pleated medical face masks. The pleats or folds can extend in any suitable direction, e.g., in a transverse direction crossways on the mask body, or in a direction from the upper perimeter segment 24 to the lower perimeter segment 25. In one or more embodiments, one or more pleats or folds can be formed in the sinus region 60 of the mask body 12 such that such pleats or folds are formed in the contrast layer 40.

Figure 4:
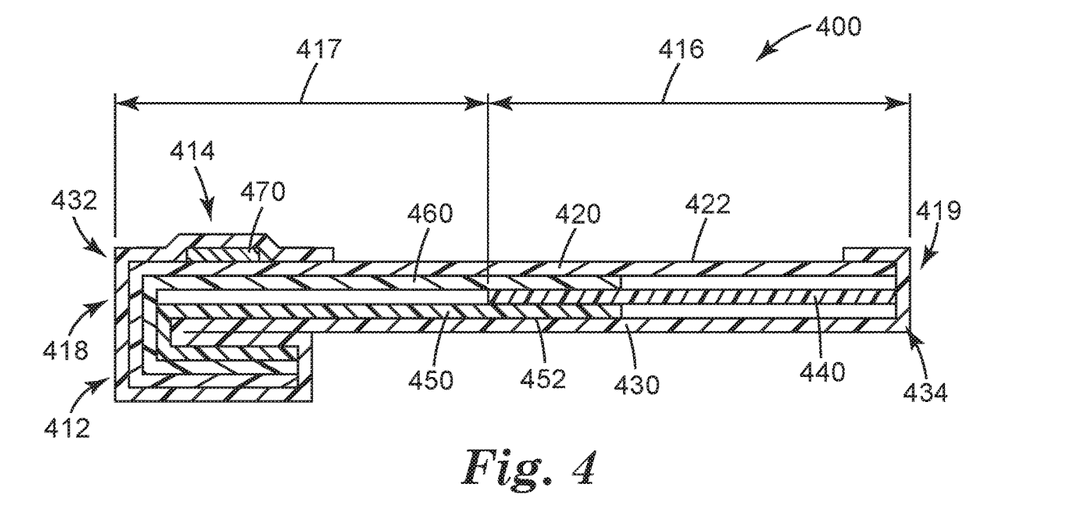
FIG. 4 is a schematic cross-section view of another embodiment of a respirator.

As previously mentioned herein, the mask body 12 can include any suitable layers, material, or combination of materials. For example, FIG. 4 is a schematic cross-section view of one embodiment of a respirator 400. All of the design considerations and possibilities regarding the respirator 10 of FIGS. 1-3 apply equally to the respirator 400 of FIG. 4. The respirator 400, which includes a mask body 412, can also include a harness attached to the mask body (such harness not shown in FIG. 4 for the sake of clarity). Any suitable harness can be utilized with respirator 400, e.g., harness 14 of respirator 10 as illustrated in FIG. 1.

As shown in FIG. 4, the mask body 412 includes an outer cover web 420, an inner cover web 430, and a filtration layer 440 disposed between the outer cover web and the inner cover web. When the mask body 412 is positioned on a face of a wearer, the inner cover web 430 is closest to the face of the wearer and the interior gas space of the mask body. The outer cover web 420 includes an outer surface 422 that faces away from the filtration layer 440.

The mask body 412 also includes a contrast layer 450 disposed between the outer cover web 420 and the inner cover web 430. In the embodiment illustrated in FIG. 4, the contrast layer 450 is disposed in a sinus region 414 of the mask body 412. The sinus region 414 can be located in a barrier region 417 of the mask body, as opposed to a primary filtering region 416.

In one or more embodiments, the mask body 412 can also include an optional barrier layer 460. The barrier layer 460 is disposed between the outer cover web 420 and the inner cover web 430 in the sinus region 414 of the mask body 412. The barrier layer 460 can be a separate layer from the contrast layer; alternatively, the barrier layer can be combined with the contrast layer such that the contrast layer provides desired barrier properties.

In one or more embodiments, the inner cover web 430 can be folded over an upper perimeter segment 418 of the mask body 412 such that a portion 432 of the inner cover web becomes the outermost layer in at least a portion of the sinus region 414 of the mask body 412. Any suitable technique or combination of techniques can be utilized to fold the portion 432 of the inner cover web 430 over the upper perimeter segment 418 of the mass body 412. The inner cover web 430 can be folder over the upper perimeter 418 any suitable distance.

As shown in FIG. 4, the filtration layer 440 is disposed between the outer cover web 420 and the inner cover web 430 such that the sinus region 414 does not include the filtration layer. In one or more alternative embodiments, at least a portion of the filtration layer 440 is disposed within the sinus region 414.

The contrast layer 450 can be positioned in any suitable location within the mask body 412. In one or more embodiments, a portion 452 of the contrast layer 450 can be disposed between the inner cover web 430 and the filtration layer 440.

In one or more embodiments, the inner cover web 430 can be used to provide a smooth surface for contacting the wearers face, and the outer cover web 420 can be used to entrap loose fibers in the mask body 412 or for aesthetic reasons. Both cover webs 420, 430 can protect the filtration layer 440. In one or more embodiments, the cover webs 420, 430 do not provide any substantial filtering benefits to the mask body 410, although outer cover web 420 can act as a pre-filter to the filtration layer 440.

To obtain a suitable degree of comfort, the inner cover web 430 can have a comparatively low basis weight and can be formed from comparatively fine fibers, often finer than those of outer cover web 420. Either or both cover webs 420, 430 may be fashioned to have a basis weight of about 5 to about 70 g/m$^2$ (typically about 17 to 51 g/m$^2$ and in some embodiments 34 to 51 g/m$^2$), and the fibers may be less than 3.5 denier (typically less than 2 denier, and more typically less than 1 denier) but greater than 0.1. Fibers used in the cover webs 420, 430 often have an average fiber diameter of about 5 to 24 micrometers, typically of about 7 to 18 micrometers, and more typically of about 8 to 12 micrometers. The cover web material may have a degree of elasticity (typically, but not necessarily, 100 to 200% at break) and may be plastically deformable.

In one or more embodiments, the cover webs 420, 430 can be made from a selection of nonwoven materials that provide a comfortable feel, particularly on the side of the mask body that makes contact with the wearer's face, i.e., inner cover web 430. Suitable materials for the cover webs may be blown microfiber (BMF) materials, particularly polyolefin BMF materials, for example polypropylene BMF materials (including polypropylene blends and also blends of polypropylene and polyethylene). Spun-bond fibers also may be used.

A typical cover web may be made from polypropylene or a polypropylene/polyolefin blend that contains 50 weight percent or more polypropylene. Polyolefin materials that are suitable for use in a cover web may include, for example, a single polypropylene, blends of two polypropylenes, and blends of polypropylene and polyethylene, blends of polypropylene and poly(4-methyl-1-pentene), and/or blends of polypropylene and polybutylene. Cover webs 420, 430 may have very few fibers protruding from the web surface after processing and, therefore, have a smooth outer surface.

The filtration layer 440 is typically chosen to achieve a desired filtering effect. The filtration layer 440 generally will remove a high percentage of particles and/or or other contaminants from the gaseous stream that passes through it. For fibrous filter layers, the fibers selected depend upon the kind of substance to be filtered.

The filtration layer 440 may come in a variety of shapes and forms and typically has a thickness of about 0.2 millimeters (mm) to 5 mm, more typically about 0.3 mm to 3 mm (e.g., about 0.5 mm), and it could be a generally planar web or it could be corrugated to provide an expanded surface area. The filtration layer 440 also may include multiple filtration layers joined together by an adhesive or any other technique. Essentially any suitable material or combination of materials can be used for forming a filtering layer may be used as the filtering material. Webs of melt-blown fibers, especially when in a persistent electrically charged (electret) form are especially useful. Electrically charged fibrillated-film fibers also may be suitable, as well as rosin-wool fibrous webs and webs of glass fibers or solution-blown, or electrostatically sprayed fibers, especially in microfilm form. Also, additives can be included in the fibers to enhance the filtration performance of webs produced through a hydrocharging process. Fluorine atoms, in particular, can be disposed at the surface of the fibers in the filter layer to improve filtration performance in an oily mist environment.

Examples of particle capture filters include one or more webs of fine inorganic fibers (such as fiberglass) or polymeric synthetic fibers. Synthetic fiber webs may include electret-charged, polymeric microfibers that are produced from processes such as meltblowing. Polyolefin microfibers formed from polypropylene that has been electrically-charged provide particular utility for particulate capture applications. An alternate filter layer may include a sorbent component for removing hazardous or odorous gases from the breathing air. Sorbents may include powders or granules that are bound in a filter layer by adhesives, binders, or fibrous structures. A sorbent layer can be formed by coating a substrate, such as fibrous or reticulated foam, to form a thin coherent layer. Sorbent materials may include activated carbons that are chemically treated or not, porous alumina-silica catalyst substrates, and alumina particles.

Although the mask body 412 has been illustrated in FIG. 4 with one filtration layer 440 and two cover webs 420, 430, the mask body may include a plurality or a combination of filtration layers. For example, a pre-filter may be disposed upstream to a more refined and selective downstream filtration layer. Additionally, sorptive materials such as activated carbon may be disposed between the fibers and/or various layers that include the filtration layer. Further, separate particulate filtration layers may be used in conjunction with sorptive layers to provide filtration for both particulates and vapors.

During respirator use, incoming air passes sequentially through layers 420, 440, and 430 outside mainly of the sinus region 414 in the primary filtering region 416 before entering the mask interior. The air that is within the interior gas space of the mask body 412 may then be inhaled by the wearer. When a wearer exhales, the air passes in the opposite direction sequentially through layers 430, 440, and 420. Alternatively, an exhalation valve (not shown) may be provided on the mask body 412 to allow exhaled air to be rapidly purged from the interior gas space to enter the exterior gas space without passing through the mask body 412. The use of an exhalation valve may improve wearer comfort by rapidly removing the warm moist exhaled air from the mask interior. Essentially any exhalation valve that provides a suitable pressure drop during inhale and that can be properly secured to the mask body may be used in connection with the present invention to rapidly deliver exhaled air from the interior gas space to the exterior gas space.

In one or more embodiments, a nose clip 470 can be disposed between the portion 432 of the inner cover web 430 that is folded over and the outer cover web 420. This folder-over portion 432 of the inner cover web 430 can secure the nose clip 470 in place using any suitable technique or combination of techniques. In one or more embodiments, an edge of the inner cover web 430 that is folder over the outer cover web 420 can be attached to the outer cover web to provide a pocket in which the nose clip 470 is positioned. In one or more alternative embodiments, the nose clip 470 can be attached to the outer cover web 420 using, e.g., glue, etc. The nose clip 470 can be disposed on the outer cover web 420 in any suitable location, e.g., in the sinus region 414 of the mask body 412 adjacent a nose of a wearer.

Although not shown, one or more sealed regions can be formed in the mask body 412. Any suitable technique or combination of techniques can be utilized to formed the sealed regions as is further described herein.

The mask body 412 may also include a structural netting or mesh juxtaposed against at least one or more of the layers 420, 430, 440, typically against an outer surface 422 of the outer cover web 420, that assist in providing a cup-shaped configuration. Any suitable structural netting or mesh can be utilized, e.g., such netting or mesh described in U.S. Pat. No. 9,012,013 to Duffy et al. The mask body 412 can also include one or more horizontal and/or vertical lines of demarcation (e.g., pleat, fold, or rib) that contribute to its structural integrity.

Figure 5:
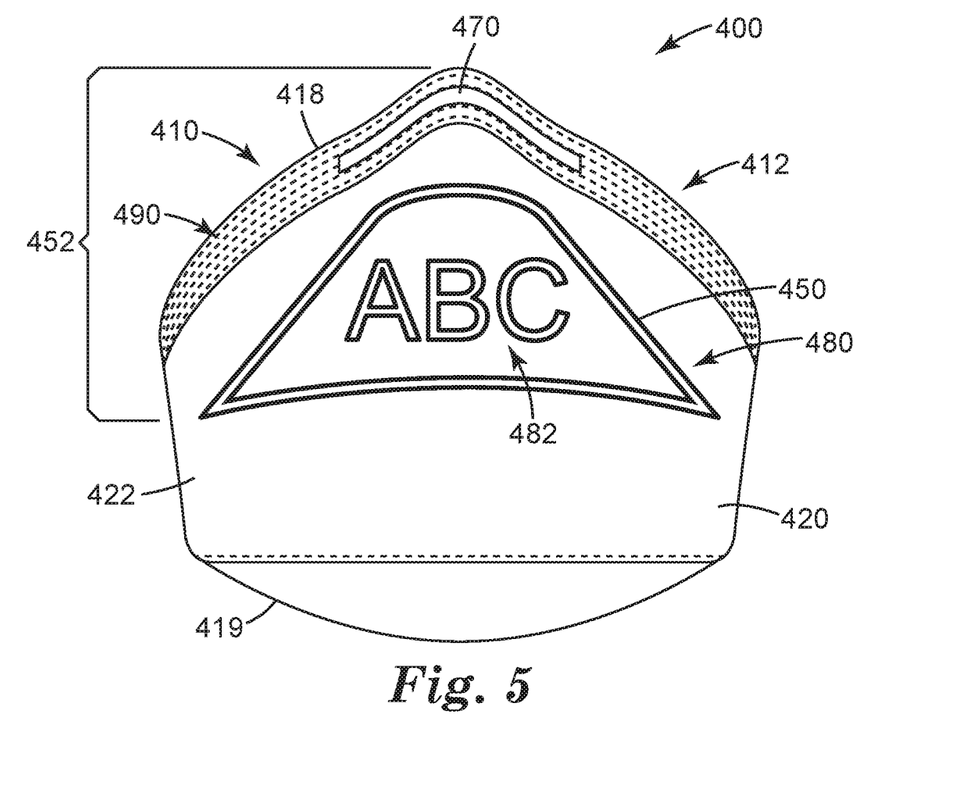
FIG. 5 is a schematic front view of the respirator of FIG. 4.

FIG. 5 is a schematic front view of the respirator 400 of FIG. 4. As shown in FIG. 5, the respirator 400 includes a contrast region 452. The contrast region 452 includes one or more sealed portions 480 that are formed in the mask body 412. The sealed portions 480 can be formed using any suitable technique or combination of techniques. For example, in one or more embodiments, the sealed portions 480 can be formed by welding using any suitable welding technique, e.g., ultrasonic, heat and pressure, etc. In the embodiment illustrated in FIGS. 4-5, the outer cover web 420 is sealed to at least the filtration layer 440 (FIG. 4) such that a portion of the contrast layer 450 is visible through the filtration layer and the outer cover web in the sealed portions 480, i.e., at least one of a color, texture, pattern, or indicia of the contrast layer 450 can be seen by a viewer while viewing the outer surface 422 of the mask body 412. The portion of the contrast layer 450 that is visible through the outer surface 422 of the outer cover web 420 forms the contrast region 452. For example, the contrast layer 450 can exhibit a selected color, e.g., red, and the outer cover web 420 and/or filtration layer 440 can exhibit any suitable color, e.g., white, and can be made of a material or materials or include any suitable structure such that the color of the contrast layer 450 is visible through and contrasts with the outer cover web and/or filtration layer in at least the sealed portions 480 of the mask body 412.

Any suitable pattern or patterns can be formed in the sealed portions 480. For example, as shown in FIG. 5, one or more indicia 482 are formed in the sealed portions 480 by one or more seal or mold patterns. In one or more embodiments, the thermal melting that can occur in the sealed portions 480 can make the contrast layer 450 dominate, or "standout" in the portions regions 480 on the mask body 412.

In one or more embodiments, the contrast layer 450 can provide desired barrier properties such that a separate barrier layer 460 is not necessary; alternatively, the barrier layer 460 can be included but is constructed of material or materials that allows for the contrast layer 450 to be visible through both the barrier layer and the outer cover web 420 in the sealed regions 480.

By allowing the contrast layer 450 to be visible through the outer cover web 420 in the contrast region 452, the contrast layer provides one or more indicators to a wearer of the proper orientation of the mask. For example, by providing one or more sealed portions 480 in the sinus region 414 of the mask body 412, the pattern formed by the sealed portions indicate to a wearer the sinus region 414 of the mask that is to be placed over or adjacent the nose of the wearer.

In one or more embodiments, the contrast layer 450 can have any suitable width. For example, the contrast layer 450 can extend into at least a portion of the primary filtering region 416. In one or more alternative embodiments, the contrast layer 450 does not extend into the primary filtering region 416.

In one or more embodiments the sealed portions 480 can be formed by sealing or welding together the outer cover web 420, the filtration layer 440, and the contrast layer 450. And in one or more alternative embodiments, the sealed portions 480 can be formed by sealing together the outer cover web 420, the filtration layer 440, the contrast layer 450, and the inner cover web 430.

The respirator 400 can also include other sealed portions or regions that do not allow for the contrast layer 450 to be seen through the outer cover web 420. For example, sealed regions 490 are formed in the sinus region 414 in the portion 432 of the inner cover web 430 that is folded over the upper perimeter segment 418 of the mask body 412. The sealed regions 490 can provide any suitable functionality to the mask body 412. For example, sealed regions 490 can hold the portion 432 of the inner cover web 430 that is folded over the upper perimeter segment 418 in place on the outer surface 422 of the outer cover web 420. By holding this portion 432 of the inner cover web 430 in place, the inner cover web can keep the nose clip 470 in place in the sinus region 414. Alternatively, in one or more embodiments, the sealed region 490 can also allow the contrast layer 450 to be visible through the outer cover web 420 and the portion 432 of the inner cover web 430.

In one or more embodiments, a portion 434 of the inner cover web 430 can also be folded over a bottom perimeter segment 419 and onto the outer cover web 420 of the mask body such that it is the outermost layer adjacent the bottom perimeter segment. As used herein, the phrase "adjacent the bottom perimeter segment" means that an element is disposed closer to the bottom perimeter segment 419 than to the upper perimeter segment 418. This portion 434 of the inner cover web 430 can be held in place or attached to the outer surface 422 of the outer cover web 420 using any suitable technique or combination of techniques, e.g., welding, etc.

As shown in FIG. 4, at least a portion of the sinus region 414 does not include a filtration layer 440. Because of the barrier properties provided by the contrast layer 450 and/or the barrier layer 460, increased pressure drop across the sinus region 414 prevents outside air from being transmitted through the mask body 412 into an inner space of the respirator 400. Because of the barrier formed in the sinus region 414, one of skill the art would, therefore, understand that the filtration layer 440 does not need to be present in the sinus region 414.

In one or more embodiments, the mask body 412 can be folded over the upper perimeter segment 418 toward the inner space of the mask body 412 to form a pleat or fold at the top perimeter as is shown in FIG. 4. This pleat or fold of the upper perimeter segment 418 of the mask body 412 can provide various desired properties, e.g., the fold can provide a cushioning layer or region of the mask body 412 to provide additional comfort to a wearer, e.g., as described in U.S. Patent Publication No. 2011/0315144 to Eitzman et al.

Figure 6:
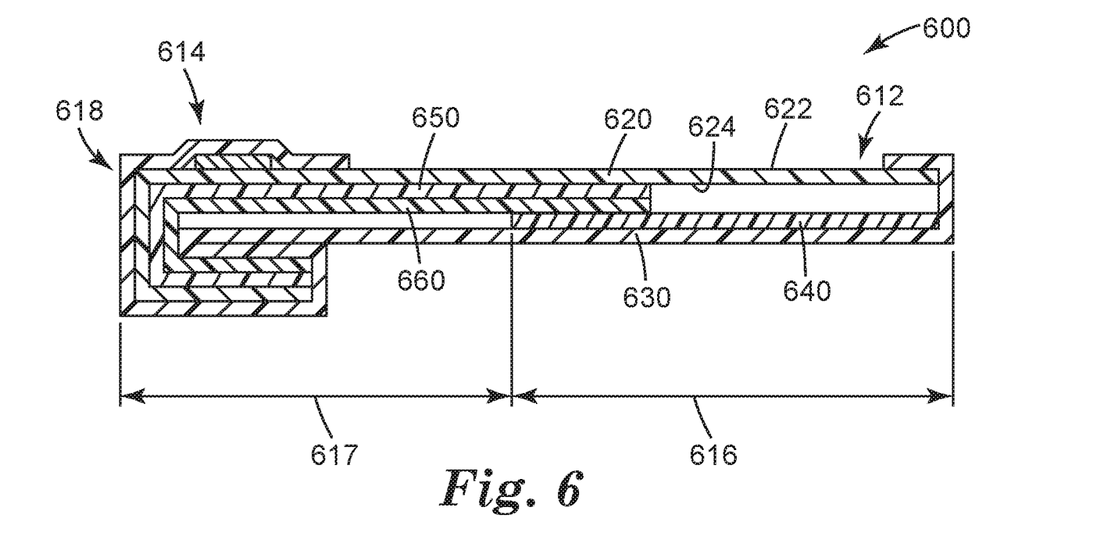
FIG. 6 is a schematic cross-section view of another embodiment of a respirator.

As mentioned herein, the various layers that form the mask body can be positioned in any suitable relationship. For example, FIG. 6 is a schematic cross-section view of another embodiment of a respirator 600. All of the design considerations and possibilities regarding the respirator 400 of FIG. 4 apply equally to the respirator 600 of FIG. 6. One difference between respirator 400 and respirator 600 is that a contrast layer 650 is disposed on an inner surface 624 of outer cover web 620 such that it is between the outer cover web and an inner cover web 630. Another difference is that the contrast layer 650 is positioned between the outer cover web 620 and an optional barrier layer 660 such that the barrier layer, if present, is between the contrast layer and the inner cover web 630 of mask body 612.

Figure 7:
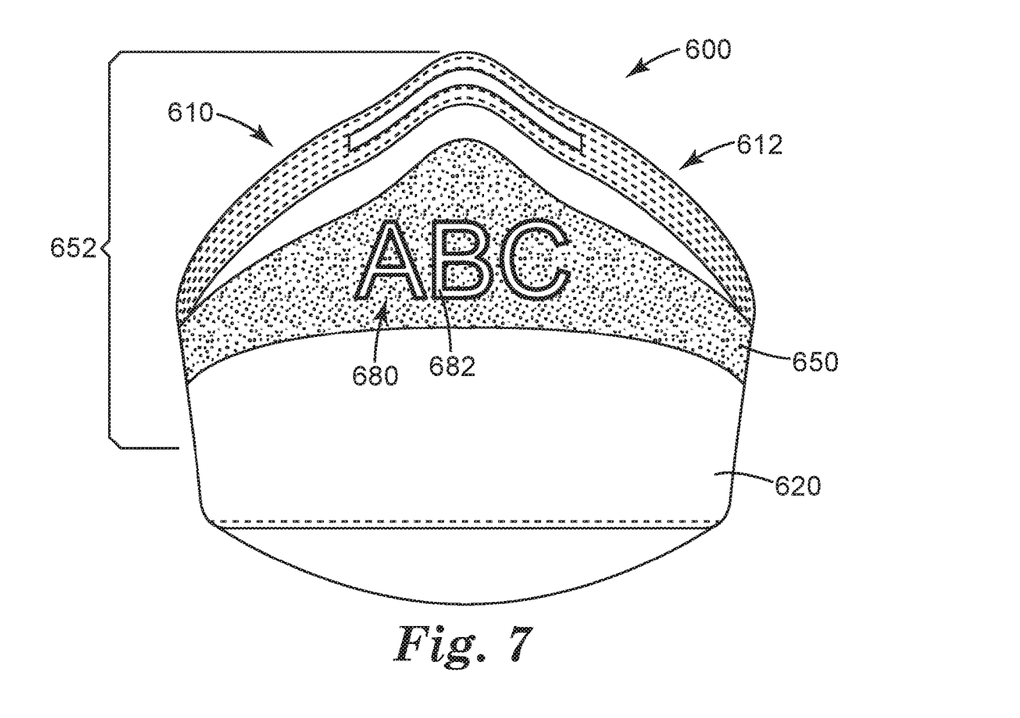
FIG. 7 is a schematic front view of the respirator of FIG. 6.

By positioning the contrast layer 650 such that it is on an inner surface 624 of the outer cover web 620, substantially all of the contrast layer, in one or more embodiments, is visible through the outer cover web. For example, FIG. 7 is a schematic front view of the respirator 600 of FIG. 6. As can be seen in FIG. 7, the contrast layer 650 is visible through the outer cover web 620 and can, in one or more embodiments, appear as a stripe transversely extending the mask body 612. This positioning of the contrast layer 650 can provide an indicator for a wearer as to the orientation of the mask 600 and can also provide distinctive identification of the respirator 600. For example, the contrast layer 650 can be positioned in a sinus region 614 of the mask body 612 such that it indicates the sinus region of the mask to the wearer.

As with the mask 400 of FIGS. 4-5, one or more sealed region 680 can be formed in the mask body 612 to provide markings or indicia 682. Any suitable markings or indicia 682 can be formed in the mask body 612 in any suitable location. Further, any suitable techniques can be used to form these markings or indicia 682.

In one or more embodiments, at least a portion of the sinus region 614 does not include a filtration layer 640. Because of the barrier properties provided by the contrast layer 650 and/or the barrier layer 660, increase in pressure drop across the sinus region 614 (i.e., barrier region 617) compared to primary filtering region 616 prevents outside air from being transmitted through the mask body 612 into an inner space of the respirator 600. Thus, one of skill the art would understand that the filtration layer 640 does not need to be present in the sinus region 614.

Figure 8:
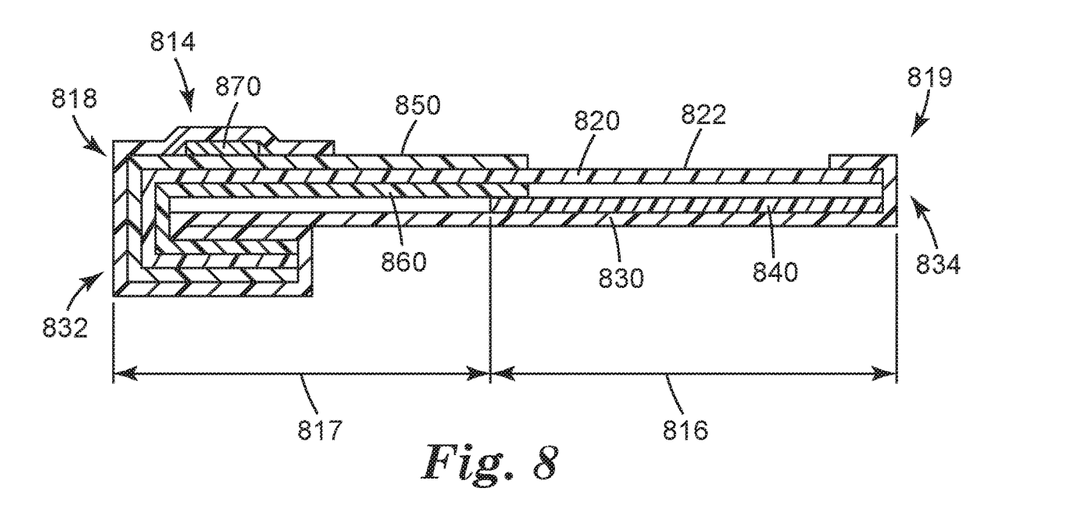
FIG. 8 is a schematic cross-section view of another embodiment of a respirator.
Figure 9:
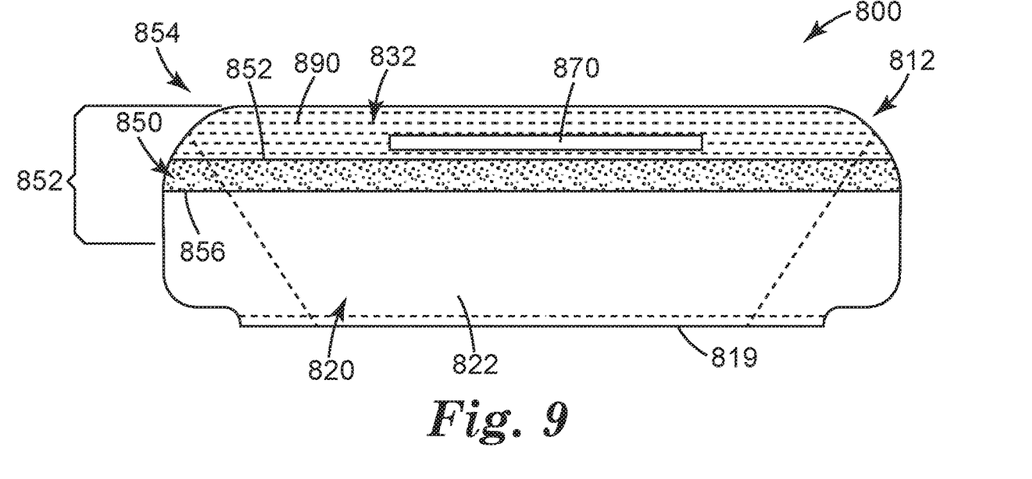
FIG. 9 is a schematic view of a mask body of the respirator of FIG. 8 in a flat configuration with flanges in an unfolded position.
Figure 10:
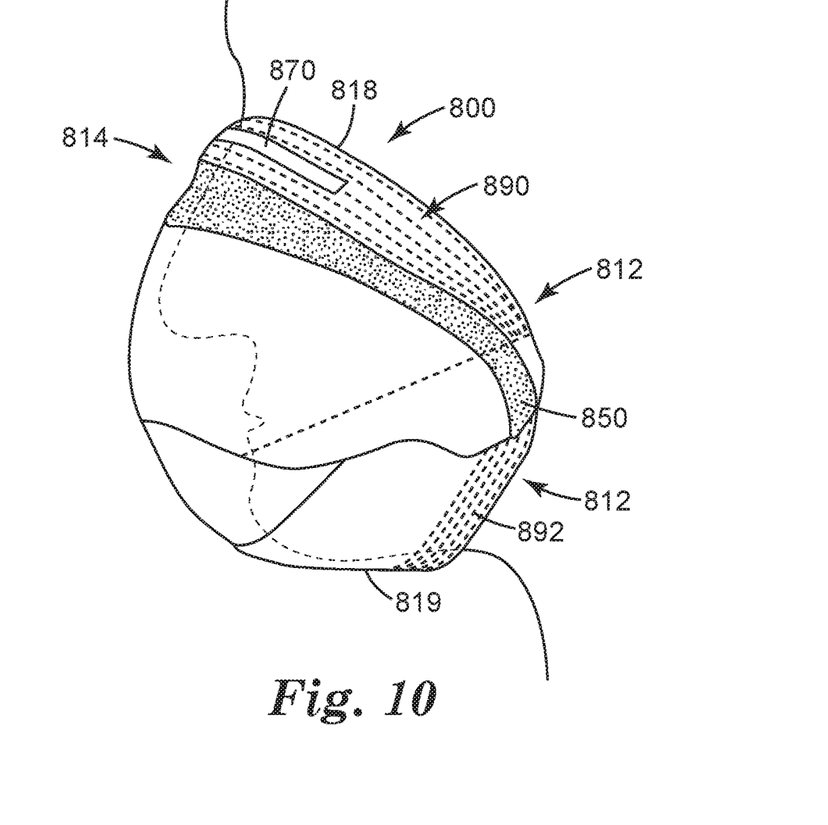
FIG. 10 is a schematic perspective view of the respirator of FIG. 8 positioned on a face of a wearer.

The contrast layers described herein can be positioned in any suitable location on or within the mask bodies of the various respirators. For example, FIGS. 8-10 are various schematic views of a respirator 800. All of the design considerations and possibilities of the respirator 400 of FIGS. 4-5 apply equally to the respirator 800 of FIGS. 8-10. One difference between respirator 800 and respirator 400 is that contrast layer 850 is positioned on an outer surface 822 of outer cover web 820. The contrast layer 850 can be positioned in any suitable location on the outer surface 822 of the outer cover web 820. In the embodiment illustrated in FIGS. 8-10, the contrast layer 850 is positioned in a sinus region 814 of the mask body 812.

The contrast layer 850 can include any suitable contrast layer described herein, e.g., contrast layer 40 of FIG. 1. Further, the contrast layer 850 can be attached or disposed on the outer surface 822 of outer cover web 820 using any suitable technique or combination of techniques, e.g., sealing, adhering, ultrasonic welding, thermally bonding, etc.

The respirator 800 can also include an optional barrier layer 860 disposed between the outer cover web 820 and an inner cover web 830; alternatively, the contrast layer 850 can include desired barrier properties such that a separate barrier layer 860 is not necessary. The barrier layer 860 can be any suitable barrier layer described herein.

In one or more embodiments, at least a portion of the sinus region 814 does not include a filtration layer 840. Because of the barrier properties provided by the contrast layer 850 and/or the barrier layer 860, and increased pressure drop across the sinus region 814 prevents outside air from being transmitted through the mask body 812 into an inner space of the respirator 800. Thus, one of skill the art would understand that the filtration layer 840 does not need to be present in the sinus region 814.

As mentioned herein, the contrast layer 850 is positioned on the outer surface 822 of outer cover web 820. For example, a portion 854 (FIG. 9) of the contrast layer 850 is disposed between a portion 832 of the inner cover web 830 that has been folded over a top perimeter segment 818 of the mask body 812. This portion 832 of the inner cover web 830 becomes the outermost layer in the sinus region 814 of the mask body 812. This portion 854 of the contrast layer 850 can in one or more embodiments be visible through the portion 832 of the inner cover web 830 that is disposed over the outer surface 822 of the outer cover web 820. As shown in FIGS. 8-10, a portion 856 of the contrast layer 850 that is not disposed between the portion 832 of the inner cover web 830 and the outer cover web 820 provides contrast with the outer cover web. This portion 856 of contrast layer 850 also provides contrast with portion 854 of the contrast layer 850. These contrasting portions of the contrast layer 850 as well as the contrast between the contrast layer and the outer cover web 820 forms contrast region 852 and provides a unique look as well as an indication to a wearer of a proper orientation of the mask as is previously described herein.

In one or more embodiments, a nose clip 870 can also be provided on the contrast layer 850 such that it is visible through the portion 832 of the inner cover web 830 that has been folded over the upper perimeter segment 818 of the mask body 812. As previously described herein, the nose clip 870 can be formed using any suitable material or materials and can have any suitable appearance. In one or more embodiments, the nose clip 870 can be formed using a material having a different texture, pattern, or color from the contrast layer 850 such that the nose clip provides additional contrast to the mask body 812 as compared to the portions 854, 856 of the contrast layer 850 and the outer cover web 820.

The mask body 812 can also include one or more sealed portions (not shown), e.g., sealed portions 480 of respirator 400 of FIGS. 4-5. Such sealed portions can be formed in any suitable location on the mask body 812. In one or more embodiments, the sealed portions can form any suitable markings or indicia.

As previously described herein, the mask body 812 can also include additional seals or welds 890 positioned in any suitable location on the mask body. For example, as seen in FIGS. 9-10, one or more seals or welds 890 can be formed in the sinus region 814 of the mask body 812. The seals or welds 890 can fix the portion 832 of the inner cover web 830 that has been folded over the upper perimeter segment 818 of the mask body 812. Additional seals or welds can be formed in other locations on the mask body as well. For example seals or welds 892 have been formed adjacent a lower perimeter segment 819 of the mask body. These seals or welds 892 can fix a portion 834 (FIG. 8) of the inner cover web 830 that has been folded over the lower perimeter segment 819 of the mask body 812 such that it is the outermost layer adjacent the lower perimeter.

These various seems or welds 890, 892 can be seen in FIG. 10, which is a schematic perspective view of the respirator 800 placed on a face of a wearer. As can also be seen in FIG. 10, the contrast layer 850 can indicate to a wearer the proper orientation of the mask 800 such that it is disposed on the face in a desired location or orientation. In this embodiment, contrast layer 850 indicates to the wearer that the sinus region 814 is to be placed on or adjacent the nose of the wearer.

In one or more embodiments, one or more folds or pleats (not shown) can also be formed in the mask in any suitable location. For example, in one or more embodiments, one or more folds or pleats can be formed in the sinus region 814 of the mask body 812. These one or more pleats or folds can be formed through one or more of the outer cover web 820, contrast layer 850, and the portion 832 of the inner cover web 830, as well as the inner cover web itself.

Figures 11, 12, 13:
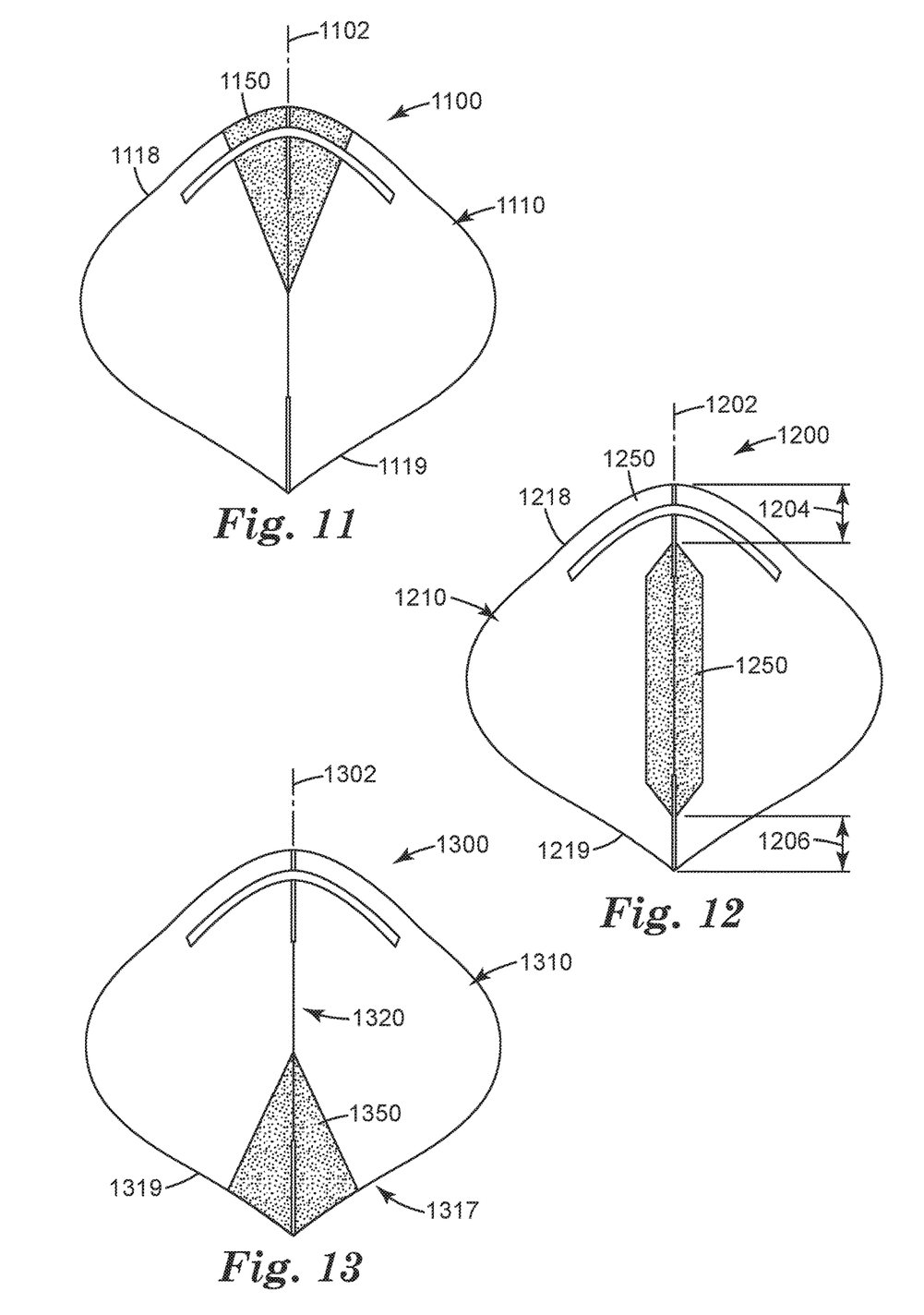
FIG. 11 is a schematic front view of another embodiment of a respirator.
FIG. 12 is a schematic front view of another embodiment of a respirator.
FIG. 13 is a schematic front view of another embodiment of a respirator.

FIG. 11 is a schematic view of another embodiment of a respirator 1100. All of the design considerations and possibilities regarding the respirator 10 of FIGS. 1-3 apply equally to the respirator 1100 of FIG. 11. As shown in FIG. 11, a contrast layer 1150 is disposed along a folding axis 1102 of mask body 1110 on or within the mask body as is further described herein. The folding axis 1102 indicates a fold line along which the mask body can be folded. The contrast layer 1150 extends along the folding axis 1102 from an upper perimeter segment 1118 towards a lower perimeter segment 1119. The contrast layer 1150 can be any suitable dimension, e.g., the layer can extend any suitable distance along the folding axis 1102. In one or more embodiments, the contrast layer 1150 can be positioned any suitable distance from the upper perimeter segment 1118 to any suitable distance from the lower perimeter segment 1119. Further, the contrast layer 1150 can be any suitable width or shape.

FIG. 12 is a schematic front view of another embodiment of a respirator 1200. All of the design considerations and possibilities regarding the respirator 10 of FIGS. 1-3 apply equally to respirator 1200 of FIG. 12. As shown in FIG. 12, a contrast layer 1250 extends along a vertical folding axis 1202 of mask body 1210 such that it begins a distance 1204 from a top perimeter segment 1218 along the folding axis to a distance 1206 from a bottom perimeter segment 1219 of the mask body. Although the contrast layer 1250 is illustrated as taking a trapezoidal shape, the contrast layer can take any suitable shape, e.g., triangular, trapezoidal, curvilinear, ovoid, etc. further, the contrast layer 1250 can be disposed on or in the mask body 1210 as is further described herein.

Alternatively, the contrast layers described herein can be positioned in or on a lower portion of the mask body. For example, FIG. 13 is a schematic front view of a respirator 1300 that includes a contrast layer 1350 disposed in a lower portion 1317 of mask body 1310. The contrast layer 1350 extends along a vertical folding axis 1302 from a lower perimeter segment 1319 to a central region 1320 of the mask body. The contrast layer 1350 can be any suitable shape and dimension and can be disposed on or in the mask body 1310 as is previously described herein.

Figure 14:
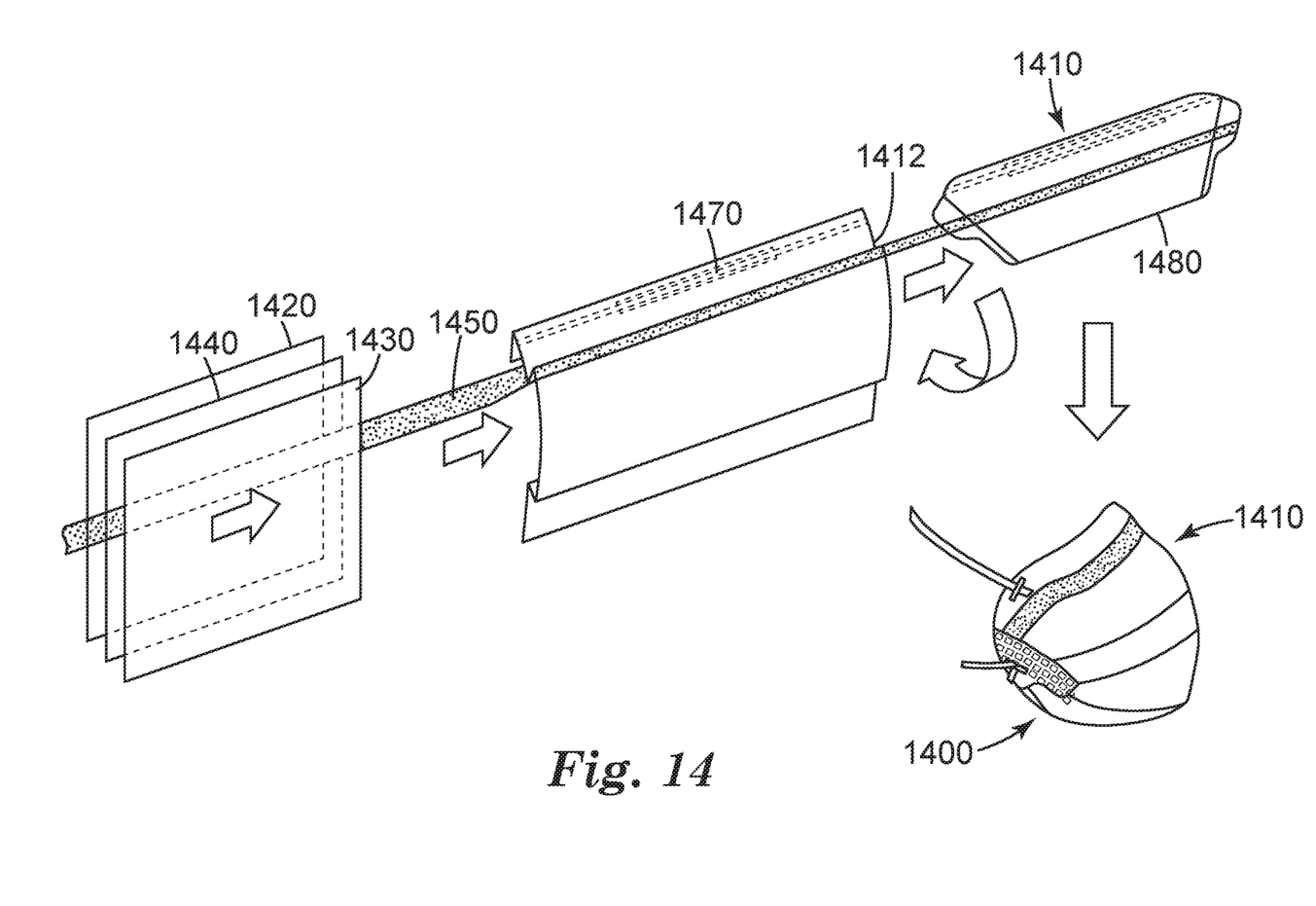
FIG. 14 is a schematic perspective view of one embodiment of a method of forming a respirator.

Any suitable technique or combination of techniques can be utilized to form the respirators described herein. For example, FIG. 14 is a schematic perspective view of an exemplary method for forming respirator 1400, such as that illustrated in FIG. 1. The respirator 1400 is assembled in two operations—mask body making and mask finishing. The mask body making stage includes (a) lamination and fixing of nonwoven fibrous webs, (b) placement of a contrast and or barrier layers, (c) insertion of a nose clip, (d) formation of pleats, (e) folding of pleats along crease lines, (f) sealing the lateral mask edges, and (g) cutting to final form, which may be done in any sequence(s) or combination(s). The mask finishing operation may include forming a cup-shaped-structure and connecting flanges to the cup-shaped structure, and attaching a harness (e.g., straps or headband). At least portions of this method can be considered a continuous process rather than a batch process; for example, the mask body can be made by a process that is continuous in the machine direction. Additionally, the contrast layer can be inserted as a continuous process.

Individual material sheets, e.g., an inner cover web 1420, an outer cover web 1430, and a filtration layer 1440, can be brought together and plied in face-to-face orientation together with a contrast layer 1450. In the illustrated embodiment, the contrast layer 1450 is fed between the filtration layer 1440 and the inner cover web 1420; however, the contrast layer can be disposed in any suitable location on or in the respirator 1400 as is further described herein. These materials are then laminated together, for example, by adhesive, thermal welding, or ultrasonic welding, to form the mask body and cut to desired size, with the contrast layer 1450 present between two of the layers of 1420, 1430, 1440. In one or more alternative embodiments, the contrast layer 1450 is applied on a surface of the laminated webs (e.g., on the surface of the outer cover web 1430) and the laminated mask body 1410 can be folded over as described herein.

A nose clip 1470 can be attached to the mask body 1410, in some embodiments on the outer cover web 1430, in other embodiments in a pocket formed between the outer cover web 1430 and the filtration layer 1440, and in yet other embodiments in a pocket formed between the outer cover web and the inner cover web 1420, the inner cover web having been folded over. The resulting laminate with the contrast layer 1450 and the nose clip 1470 is then folded and/or pleated and various seals and bonds are made, including demarcation line 1480. The folded laminate material is then further folded and additional seals are made to form various features, such as the flanges (e.g., flanges 30, 31, of respirator 10) on the flat mask body 1410. In one or more embodiments, the inner cover web 1420, the filtration layer 1440, the outer cover web 1430, and the contrast layer 1450 can be joined together to form the mask body 1410. Straps can be added and the flat mask can be expanded to a cup shape.

As previously described herein, a portion of the inner cover web 1420 can be folded over an upper perimeter of the mask body such that a portion of the inner cover web becomes the outermost layer in a sinus region of the mask body adjacent an upper perimeter of the mask body. Further, in one or more embodiments a pleat 1412 can be formed in the sinus region of the mask body as is previously described herein. The pleat 1412 can be formed such that it extends through the sinus region.

Further, in one or more embodiments, the outer cover web 1430 can be sealed to at least the filtration layer 1440 to form a sealed portion (e.g. sealed portion 480 of respirator 400 as illustrated in FIG. 5).

All references and publications cited herein are expressly incorporated herein by reference in their entirety into this disclosure, except to the extent they may directly contradict this disclosure. Illustrative embodiments of this disclosure are discussed and reference has been made to possible variations within the scope of this disclosure. These and other variations and modifications in the disclosure will be apparent to those skilled in the art without departing from the scope of the disclosure, and it should be understood that this disclosure is not limited to the illustrative embodiments set forth herein. Accordingly, the disclosure is to be limited only by the claims provided below.

What is claimed is:

1. A method of making a respirator, comprising:
    forming a mask body of the respirator, the mask body comprising an outer cover web, an inner cover web, a filtration layer disposed between the outer cover web and the inner cover web, and a contrast layer disposed between the outer cover web and the inner cover web in a sinus region of the mask body, wherein a portion of the contrast layer is visible through an outer surface of the outer cover web to form a contrast region of the mask body, wherein the outer surface of the outer cover web faces away from the filtration layer; and
    folding a portion of the inner cover web over an upper perimeter segment of the mask body and over a portion of an outer surface of the outer cover web such that the portion of the inner cover web becomes the outermost layer in the sinus region of the mask body.

2. The method of claim 1, further comprising forming a pleat in the mask body that transversely extends through the sinus region.

3. The method of claim 2, wherein the pleat is formed in the sinus region of the mask body by a process that is continuous in the machine direction.

4. The method of claim 1, wherein the mask body includes a structural netting or mesh juxtaposed against at least one of the outer cover web, the inner cover web, and the filtration layer.

5. The method of claim 1, wherein forming the mask body is performed in a process that is continuous in the machine direction.

6. The method of claim 1, wherein the contrast layer is inserted between the outer cover web and the inner cover web in a continuous process.

7. The method of claim 1, wherein the respirator includes a mask body and a harness attached to the mask body.

8. The method of claim 1, wherein at least a portion of the sinus region adjacent an upper perimeter segment of the mask body does not include the filtration layer.

9. The method of claim 1, wherein the respirator further includes a barrier layer disposed between the outer cover web and the inner cover web in the sinus region of the mask body.

10. The method of claim 1, wherein at least a portion of the contrast layer is disposed between the inner cover web and the filtration layer.

11. The method of claim 1, wherein the contrast region comprises a sealed portion where the outer cover web is sealed to the filtration layer, wherein the portion of the contrast layer that is visible through the outer cover web is disposed in the sealed portion.

12. The method of claim 1, wherein the contrast layer is disposed between the filtration layer and the outer cover web.

13. The method of claim 1
    wherein forming the mask body further comprises insertion of a nose clip, formation of pleats, folding of the pleats along crease lines, sealing the lateral mask edges, and cutting to final form.

14. The method of claim 13, wherein forming the mask includes the steps of forming a cup-shaped structure, connecting flanges to the cup-shaped structure, and attaching a harness.

15. The method of claim 14, wherein at least one of the steps is performed in a continuous process.

16. The method of claim 13, wherein the mask body making is performed in a process that is continuous in the machine direction.

17. The method of claim 9, wherein the placement of a contrast layer and/or barrier layers is performed in a continuous process.

18. A respirator made using the method of claim 13.

19. A respirator made using the method of claim 1.

* * * * *